UNITED STATES PATENT OFFICE.

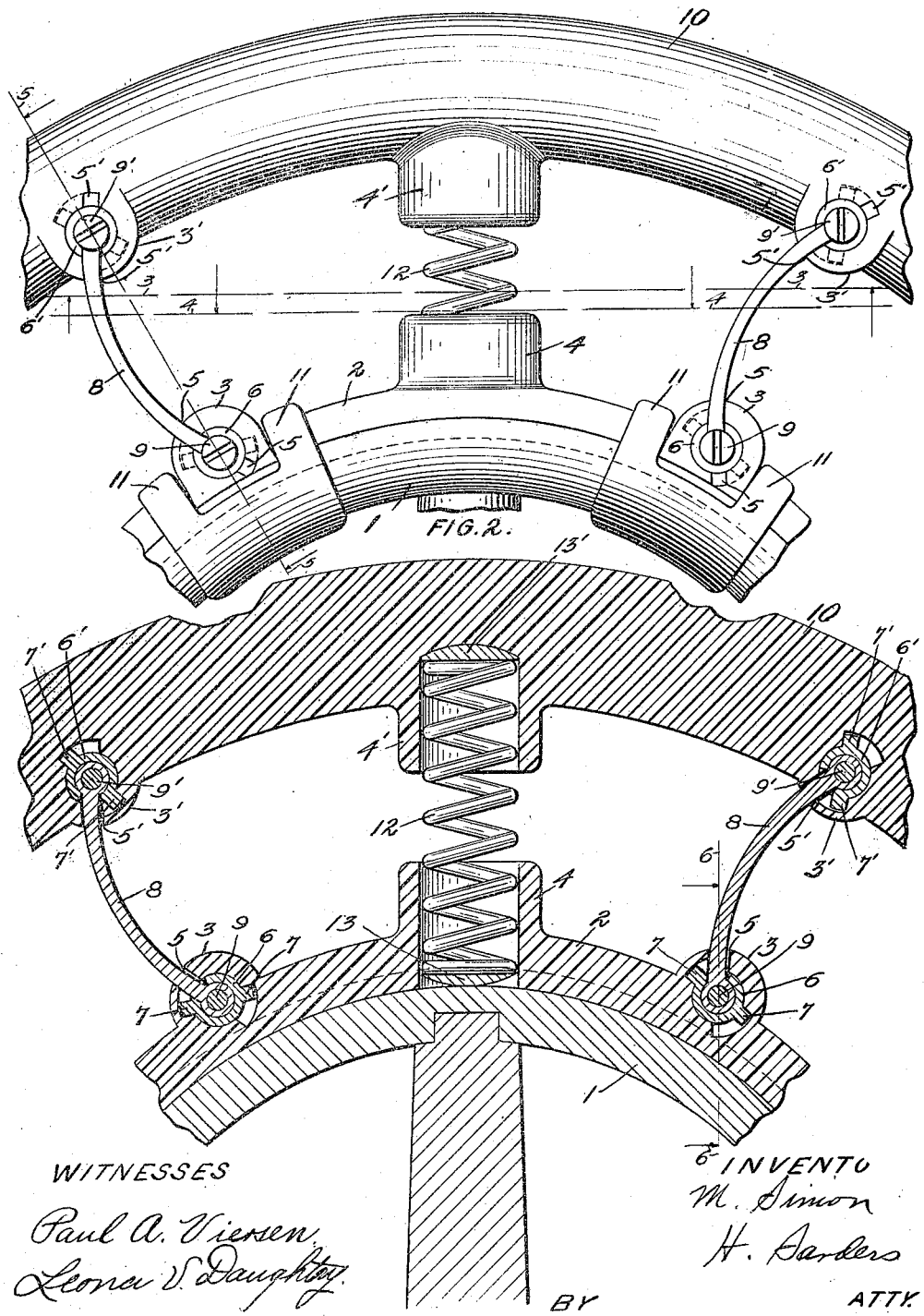

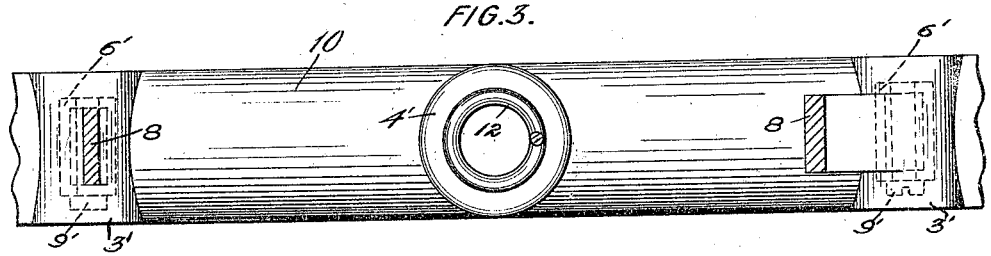
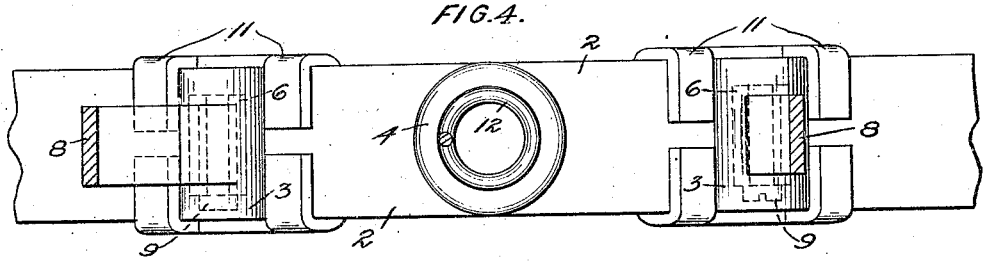
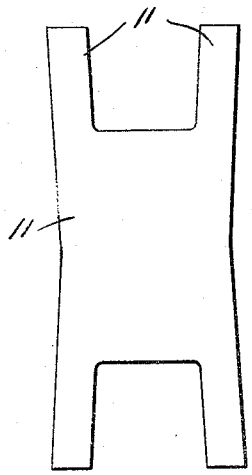
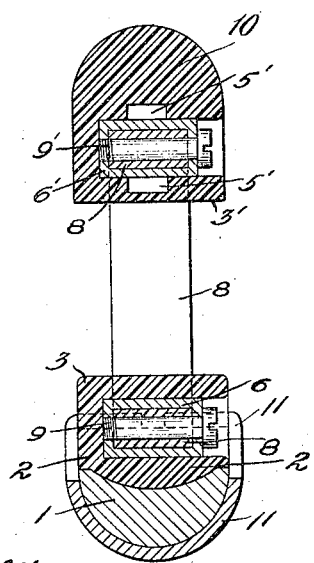
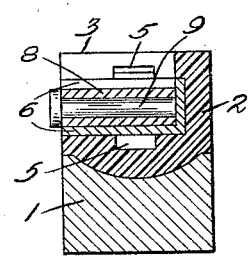

MORECZ SIMON, OF EAST CHICAGO, INDIANA.

VEHICLE-TIRE.

1,137,357. Specification of Letters Patent. Patented Apr. 27, 1915.

Application filed February 11, 1913, Serial No. 747,722. Renewed March 26, 1915. Serial No. 17,278.

*To all whom it may concern:*

Be it known that I, MORECZ SIMON, a citizen of Hungary, residing at East Chicago, in the county of Lake and State of Indiana, have invented certain new and useful Improvements in Vehicle-Tires, of which the following is a specification.

This invention relates to improvements in vehicle tires and its object is to produce a durable and smooth riding tire particularly adapted for use upon automobiles and its construction involves the provision of a solid rubber tire disposed upon the rim of the vehicle wheel and provided with cavities wherein one end of a plurality of spring stays are disposed and suitably spaced apart and arranged alternately with said stays, sockets are formed adapted to retain one termination of spiral springs, said stays and springs having their opposite ends disposed, respectively, in cavities and sockets of similar formation formed in an auxiliary rim carried by the said tire.

The invention consists in the combination and arrangement of parts to be hereinafter fully described in the following specification, pointed out in the claims and illustrated in the accompanying drawings which form a part of said specification and in which—

Figure 1 is a side elevation of a portion of my improved vehicle tire in position upon the rim of a vehicle. Fig. 2 is a section taken therethrough. Fig. 3 is a plan of the auxiliary rim taken on line 3—3 of Fig. 1. Fig. 4 is a plan of the tire taken on line 4—4 of Fig. 1. Fig. 5 is a section taken on line 5—5 of Fig. 1. Fig. 6 is a section taken on line 6—6 of Fig. 2. Fig. 7 is a plan of a casting employed.

Like reference characters indicate corresponding parts throughout the several views.

1 is the rim of a vehicle wheel to which my rubber tire 2 is secured. The tire is provided at spaced intervals upon its periphery with a plurality of protuberances 3 and sockets 4 alternately arranged. The several protuberances are of hollow formation and provided with opening apertures 5 through which the metal bushing 6 is introduced which is formed of a broken annular portion and with integral oppositely disposed lugs 7. The body portion of a spring stay 8 is adapted to pass through and partially reside in the aperture 5 of the protuberance 3 and in the broken portion of the annular part 6 of the bushing, and the apertured annular terminations of said spring stays reside within the annular portions 6 of the bushings upon screw pins 9 passing through the protuberances and bushings. The opposite ends of the spring stays are of similar shape and formation and are disposed within similar protuberances 3' of the auxiliary rim 10, said protuberances 3' being formed with opening apertures 5' and adapted to contain metal bushings 6' similar to the bushings 6 and also provided with integral lugs 7' and said bushings and spring stay terminations are pierced by screw pins 9'. About the rim 1 of the wheel and partially about the tire 2 adjacent the protuberances 3 castings 11 are disposed whose extremities are bifurcated to inclose said protuberances and give strength and rigidity to the construction.

Within the sockets 4 one end of strong spiral springs 12 is disposed which rests terminally upon metallic heads 13, the opposite ends of said springs being disposed in similar sockets 4', formed integral with the auxiliary rim 10, upon heads 13'. It will be noticed that the spring stays are curved to afford an added degree of flexibility.

When this wheel is in use the load will be carried by the shock absorbing mediums, that is, by the stays 8 and springs 12 as the wheel rotates. The auxiliary rim 10 coming in contact with the supporting surface will compress the flexible mediums toward the tire 2 and by these mediums any shock or sudden impact due to rough roads will be taken up.

What is claimed is:—

1. The combination with a vehicle wheel rim of a flexible tire formed with a plurality of integral hollow protuberances and sockets alternately arranged upon its periphery, an auxiliary flexible rim formed with similar and oppositely disposed integral hollow protuberances and sockets alternately arranged upon its periphery, a metal bushing disposed within each of said hollow protuberances, spring stays terminally disposed within said metal bushings and hollow protuberances of said tire and rim and springs connecting the oppositely disposed sockets of said tire and rim.

2. The combination with a vehicle wheel rim of a flexible tire formed with a plurality of integral hollow protuberances and sockets alternately arranged upon its periphery, metal castings encompassing said hollow protuberances, an auxiliary flexible rim formed with similar and oppositely disposed integral hollow protuberances and sockets alternately arranged upon its periphery, a metal bushing disposed within each of said hollow protuberances, spring stays terminally disposed within said metal bushings and hollow protuberances of said tire and rim and springs connecting the oppositely disposed sockets of said tire and rim.

In testimony that I claim the foregoing as my own I have hereto affixed my signature in the presence of two subscribing witnesses.

MORECZ SIMON.

Witnesses:
LOUIS DRAGOS,
JOSEPH SOMLYO.

Copies of this patent may be obtained for five cents each, by addressing the "Commissioner of Patents, Washington, D. C."